United States Patent
Schiesel

(12) 
(10) Patent No.: US 6,209,134 B1
(45) Date of Patent: Apr. 3, 2001

(54) PET BIB

(76) Inventor: Kathleen A. Schiesel, 16144 E. 460 Rd., Claremore, OK (US) 74017

( * ) Notice: Subject to any disclaimer, the term of this patent is extended or adjusted under 35 U.S.C. 154(b) by 0 days.

(21) Appl. No.: 09/325,133

(22) Filed: Jun. 8, 1999

(51) Int. Cl.[7] ............................ A41D 1/04; A41D 13/04
(52) U.S. Cl. ................................ 2/102; 2/46; 2/49.1
(58) Field of Search ........................... 2/102, 48, 46, 2/49.1, 49.2, 51, 49.4, 50, 52, 115, 104, 94, 69, 106; 446/28; 119/537, 600, 702, 706, 707, 708, 174

(56) References Cited

U.S. PATENT DOCUMENTS

| | | | |
|---|---|---|---|
| 331,004 | * | 11/1885 | Reilly ........................................ 446/28 |
| D. 392,439 | | 3/1998 | Okoniewski ........................... D2/829 |
| 2,066,072 | * | 12/1936 | Powell ........................................ 2/51 |
| 2,831,193 | * | 4/1958 | Terry .......................................... 2/46 |
| 3,308,479 | * | 3/1967 | Sesco, Jr. .................................... 2/50 |
| 3,777,310 | * | 12/1973 | Yang ........................................... 2/48 |
| 4,068,313 | * | 1/1978 | Goldman ................................. 2/49.1 |
| 4,139,912 | * | 2/1979 | Thuaud ....................................... 2/50 |
| 4,912,780 | * | 4/1990 | Falack ...................................... 2/102 |
| 4,919,081 | * | 4/1990 | Lewellen .................................... 2/46 |
| 5,022,093 | * | 6/1991 | Hall ......................................... 2/158 |
| 5,046,980 | * | 9/1991 | Tai et al. ................................. 2/49.4 |
| 5,075,900 | | 12/1991 | Chittenden ................................. 2/94 |
| 5,195,187 | | 3/1993 | Yang ........................................ 2/102 |
| 5,394,565 | | 3/1995 | Stewart et al. ............................. 2/69 |
| 5,465,425 | | 11/1995 | Crispin .................................... 2/102 |
| 5,623,729 | | 4/1997 | Chen ....................................... 2/461 |
| 5,664,258 | | 9/1997 | Harris ....................................... 2/84 |
| 5,829,060 | | 11/1998 | Falk et al. ............................... 2/102 |
| 5,991,925 | * | 11/1999 | Wu .......................................... 2/102 |

* cited by examiner

*Primary Examiner*—Amy B. Vanatta
(74) *Attorney, Agent, or Firm*—Molly D. McKay

(57) ABSTRACT

The present invention is a washable bib for wearing over the torso of an individual when the individual is playing with pets. The bib is adjustable at the sides via hook and loop strips to fit most people. Padding is provided at the shoulders of the bib to protect the wearer from injury from a pet's claws. The front of the bib is provided with one set of top opening pockets that are located high on the chest of the wearer and another set of larger top opening pockets that are located at the bottom of the front of the bib. The front of the bib is also provided with interchangeable pet toys that removably secure to the bib under flaps provided on the front of the bib just below the highest set of pockets so that the toys may be removed from the bib when the bib is laundered.

8 Claims, 3 Drawing Sheets

PET BIB

BACKGROUND OF THE INVENTION

1. Field of the Invention

The present invention relates to a bib for wearing over the torso of an individual when playing with pets. The bib is adjustable at the sides to fit most people. Padding is provided at the shoulders of the bib to protect the wearer from injury from a pet's claws as the pet perches on the wearer's shoulders. The front of the bib is provided with one set of pockets that are located high on the chest of the wearer and another set of pockets that are located at the bottom of the bib. The pockets can be used for hiding treats for the pets or the pets may use the pockets as hiding places. The front of the bib is also provided with interchangeable pet toys that removably secure to the bib under flaps provided on the front of the bib.

2. Description of the Related Art

Pet owners, and particularly those people who have multiple pets, experience certain problems when playing with their pets. The pet may soil the owner's clothing, the pet's claws may injure the owner, and the pet may become bored or scared and try to escape from the owner.

Some pets can soil the pet owner when the owner is playing with the pet. For example, birds are particularly notorious for defecating on their owners during play sessions. Thus, it would be desirable to have a washable covering to place over the owner when the owner is playing with these types of pets.

Other pets can injure the owner with their claws when they are playing. Birds and kittens are two types of pets that have sharp claws that can dig into the owner's shoulders during a play session. Thus, for these types of pets, it would be desirable to have a covering for the owner that was constructed of a thick material, such as terry cloth, and that was provided with extra padding on the shoulders, an area of the owner's torso particularly vulnerable to injury by an animal that is perched on the owner's shoulders.

Other pets are playful and like to play with toys that move, make noise or dangle. Cats are particularly playful. It would be desirable to have a covering for the owner that had toys secured to the front of it so that the owner could have his hands free to play with the pet. Since different pets may prefer different types of toys, it would be desirable to have a way to quickly change the toys that were attached to the covering.

Other pets are curious and are constantly looking for treats that may be tucked into dark recesses, such as pockets. Ferrets love to poke their noses into pockets and smaller animals, such as guinea pigs, hamsters, lizards, geckos, or snakes, like to crawl into larger pockets to hide. Because some pets like to remain perched on the shoulders of the owner whereas other pets like to crawl down the front of the owner, it would be desirable to have pockets located high on a protective covering for the owner for those pets that prefer to perch on the owner's shoulders and other pockets located at the bottom of the protective covering for those pets that are climbers.

There are a variety of vest or garments for covering the torso of an individual. Most of these vests or garments contain one or more pockets for holding items. However, most such pockets are provided with a top flap that is difficult a pet to negotiate. Also some types of vests, such as those worn by baseball umpires or police officers, are provided in the front of the vest with padding or some other type of shielding material to protect the wearing from impact with a projectile, such as for example a baseball or a bullet. Other garments are made with pockets that are removable. However, until now there were no bibs specially designed to shield the wear from the effects of playing with pets.

The present invention addresses this need. Specifically, the present invention is a washable bib that is adjustable at the sides to fit most people. The shoulders of the bib are padded to protect the wearer from injury from a pet's claws. The bib is provided with top-opening pockets that do not have top flaps. Pockets are located high on the front of the bib, adjacent to the shoulders, so that an inquisitive pet can look into the pockets to retrieve pet treats placed therein by the wearer while the pet remains perched on the wearer's shoulder. The front of the bib is also provided with removable, interchangeable pet toys that can be customized to provide entertainment for the pet and to make the pet more comfortable about being near the wearer. The bottom of the front of the bib is provided with additional larger top-opening pockets that also do not have top flaps. These larger pockets can be used for holding additional items or may serve as a place for pets to crawl into and hide.

SUMMARY OF THE INVENTION

The present invention is a washable bib for wearing over the torso of an individual when the individual is playing with pets. The bib is adjustable at the sides to fit most people. Padding is provided at the shoulders of the bib to protect the wearer from injury from a pet's claws as the pet perches on the wearer's shoulders. The front of the bib is provided with one set of pockets that are located high on the chest of the wearer and another set of larger pockets that are located at the bottom of the front of the bib. The pockets can be used for hiding treats for the pets or the pets may use the pockets as hiding places. The front of the bib is also provided with interchangeable pet toys that removably secure to the bib under flaps provided on the front of the bib so that the toys may be selected for a particular pet or pets and so that the toys may be removed from the bib when the bib is laundered.

DETAILED DESCRIPTION OF THE PREFERRED EMBODIMENT

Invention

Figure 1:
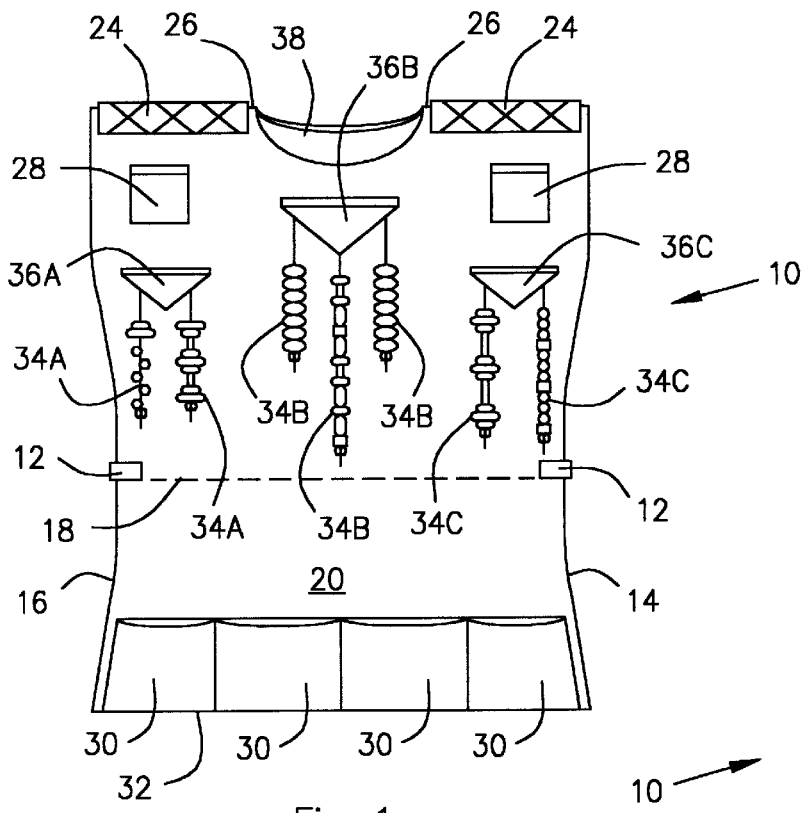
FIG. 1 is a front elevation of a pet bib constructed in accordance with a preferred embodiment of the present invention, with the pet bib shown as it would appear when being worn.

Referring now to the drawings and initially to FIGS. 1–4, there is illustrated a pet bib 10 constructed in accordance with a preferred embodiment of the present invention. The bib 10 is worn over the torso of an individual when the individual is playing with pets and is preferably constructed of a washable terrycloth material. Terrycloth is desirable because it provides a secured foothold for animals and is thick enough to protect the wearer from being soiled by the animals.

Figure 3:
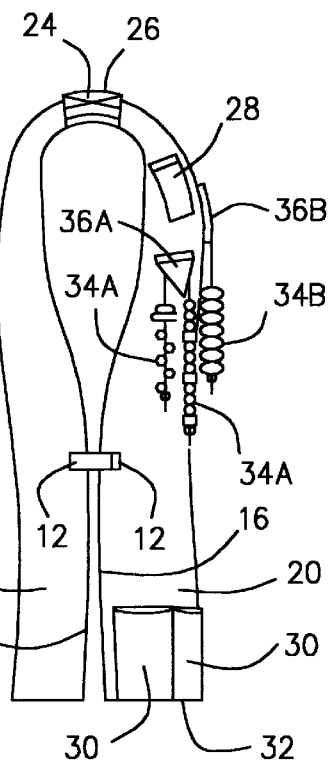
FIG. 3 is a right side elevation of the pet bib of FIGS. 1 and 2.
Figure 2:
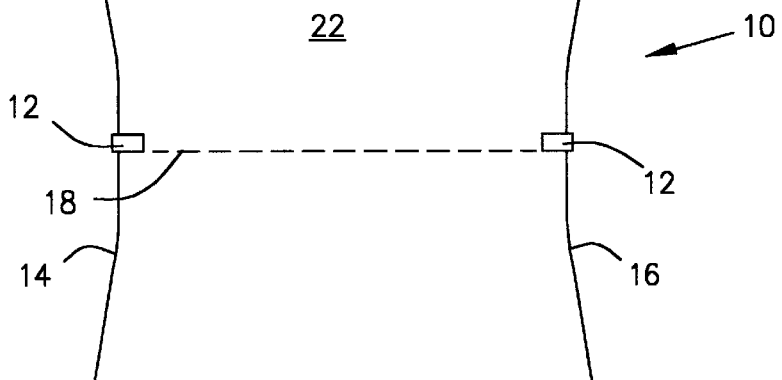
FIG. 2 is a rear elevation of the pet bib of FIG. 1.
Figure 4:
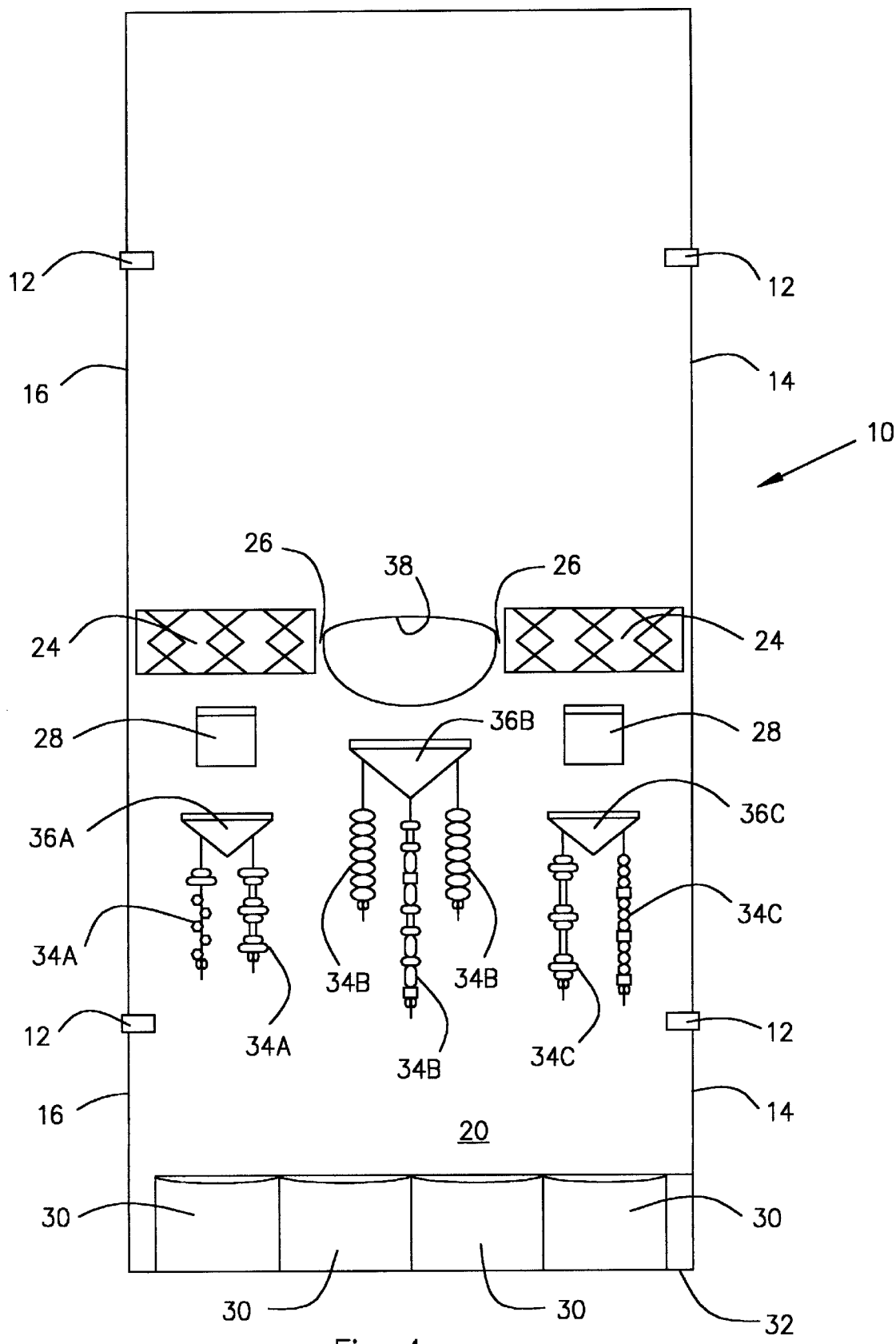
FIG. 4 is a top plan view of the pet bib of FIG. 1, as it would appear when the sides are opened up and the bib is laid out flat.

The bib 10 is adjustable at the left and right sides 14 and 16 to fit most people. Hook and loop strips 12 are provided at the waistline 18 of the bib 10 on a front 18 and a back 20 of the bib 10 as a means for adjustably securing the front 18 to the back 20 at the left and right sides 14 and 16, as illustrated in FIG. 3. The left and right sides 14 and 16 remain free from each other except for where the hook and loop strips 12 are secured together.

Padding 24 is provided at the shoulders 26 of the bib 10 to protect the wearer from injury from a pet's claws as the pet perches on the wearer's shoulders. The front 20 of the bib 10 is provided with high pockets 28 that are located high on the front 20 of the bib 10 adjacent to the shoulders 26 and larger lower pockets 30 that are located at a bottom 32 of the front 20 of the bib 10. Each of the pockets 28 and 30 is top opening and none have flaps covering the openings into the pockets 28 and 30. The pockets 28 and 30 can be used for hiding treats for the pets, or alternately, the pets may use the pockets 28 and 30 as hiding places.

Figure 5:
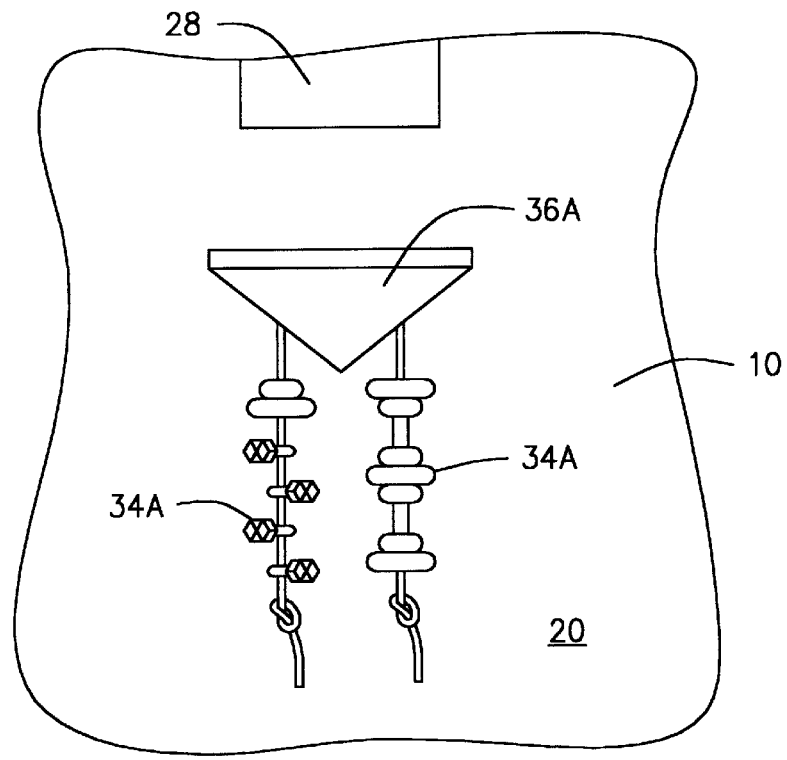
FIG. 5 is an enlarged view of one of the flaps provided on the front of the bib.
Figure 6:
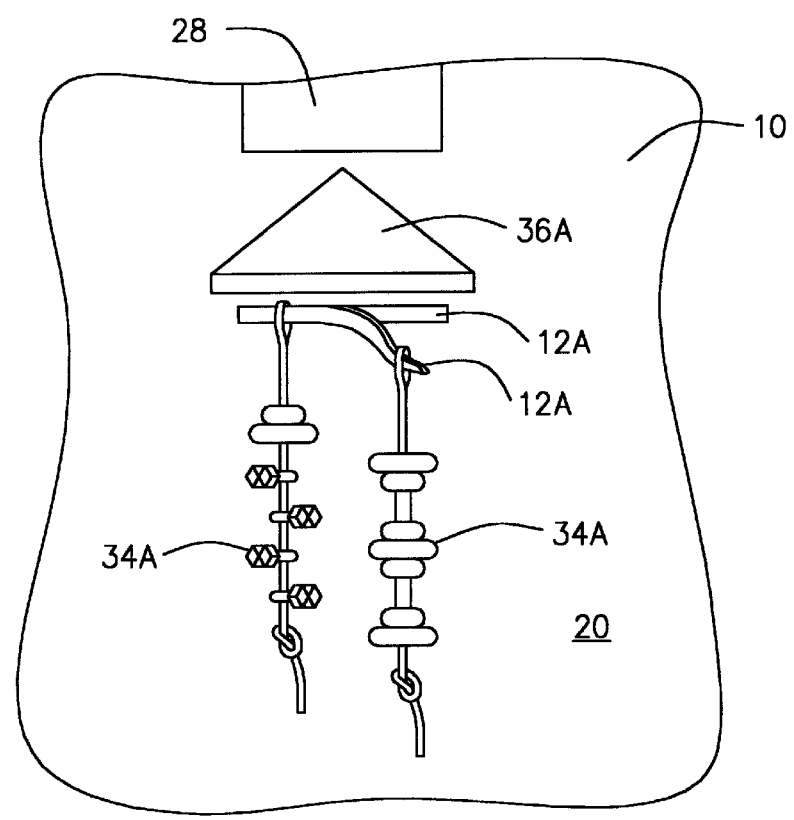
FIG. 6 is the flap of FIG. 5 shown in a raised position to expose the hook and look strip that removably secures a pet toy to the bib.

Also, as illustrated in FIGS. 5 and 6, interchangeable pet toys 34a, 34b, and 34c removably secure to the front 20 of the bib 10 via hook and loop strips 12a, 12b, and 12c. The hook and loop strips 12a, 12b, and 12c secure to the front 20 under flaps 36a, 36b and 36c that are provided on the front 20 of the bib 10. The flaps 12a, 12b, and 12c are located immediately below the high pockets 28 and a neck opening 38 in the bib 10. The neck opening 38 is provided in the bib 10 so that it lies between the two shoulders 26 of the bib 10 and between the front 20 and back 22 of the bib 10. The toys 34a, 34b, and 34c may be selected for a particular pet or pets and they can be removed from the bib 10 when the bib 10 is laundered.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A washable pet bib for wearing by an individual while playing with pets comprising:

a cloth front secured at shoulders to a cloth back so that a neck opening is formed between the shoulders and between the front and back, said front adjustably secured to said back at the sides of the front and the back, pet toys removably secured to the front, and said shoulders being provided with padding to prevent a wearer from being injured by a pet's claws.

2. A pet bib according to claim 1 further comprising:

top opening high pockets provided on the front adjacent to said shoulders.

3. A pet bib according to claim 2 further comprising:

top opening lower pockets provided along a bottom of said front.

4. A pet bib according to claim 3 further comprising:

a plurality of flaps secured to said front, each said flap extending downward over a hook and loop strip that removably secures one of said pet toys to said front.

5. A washable pet bib for wearing by an individual while playing with pets comprising:

a cloth front secured at shoulders to a cloth back to form a neck opening therebetween, sides of said front adjustably secured to sides of said back, and pet toys removably secured to the front via hook and loop strips, a flap secured to said front above each said hook and loop strip to conceal said strip.

6. A pet bib according to claim 5 further comprising:

padding provided at said shoulders to prevent a wearer from being injured by a pet's claws.

7. A pet bib according to claim 6 further comprising:

top opening high pockets provided on the front adjacent to and immediately below said shoulders.

8. A pet bib according to claim 7 further comprising:

top opening lower pockets provided along a bottom of said front.

* * * * *